2,886,548

COMPOSITION COMPRISING A VINYLIDENE CHLORIDE POLYMER AND AN ESTERIFIED POLYETHER PLASTICIZER

David Ian Hutchinson Jacobs, Aigburth, Liverpool, England, assignor to The Distillers Company Limited, Edinburgh, Scotland, a British company No Drawing. Application October 19, 1955
Serial No. 541,533

Claims priority, application Great Britain
October 28, 1954

5 Claims. (Cl. 260—31.4)

The present invention relates to plasticised compositions containing crystalline vinylidene chloride polymers and copolymers. More particularly it relates to such compositions with improved stability towards heat and/or light.

Crystalline polymers and copolymers of vinylidene chloride are capable of being softened under the influence of heat and pressure, and may thus be moulded to form useful articles, whilst some may be extruded and drawn to form useful fibres or filaments. Such polymers, however, have the disadvantage that they tend to darken and decompose at temperatures above their softening points. It is customary to add a plasticiser to the polymer in order to reduce the softening temperature to a level where thermal decomposition becomes less serious, but, with many plasticisers, this level is only reached at concentrations of plasticiser which are sufficiently high to impair the physical properties of moulded articles or filaments. It is important, therefore, to provide plasticisers which give compositions of adequate thermal stability at the working temperature when used in sufficiently low concentrations to give products of adequate rigidity or tensile strength.

Articles or filaments obtained from plasticised compositions of vinylidene chloride polymers or copolymers are subject to the further disadvantage that they undergo some decomposition when exposed for long periods to the effects of light, especially when such light contains a high proportion of ultraviolet radiation. This decomposition is accompanied by a progressive darkening in colour of the composition, which may change from a practically colourless appearance to dark brown if the action of the radiation is prolonged. General deterioration in mechanical properties may also occur.

In order to overcome these disadvantages of crystalline vinylidene chloride polymers it has been necessary to develop special plasticisers which not only facilitate the working of the polymers by lowering their softening points and improve certain physical properties of the polymers, for instance general flexibility, but also improve both the heat and light stabilities of the polymers in which they are incorporated.

Of such special plasticisers the one which has hitherto been widely used has been $\alpha,\alpha$-diphenyldiethyl ether. However this plasticiser has a relatively high volatility with the result that it tends to escape from articles prepared from vinylidene chloride polymers in which it has been incorporated with the result that the articles deteriorate both with regard to their heat and light stabilities and also with regard to their other physical properties, such as flexibility, which depend to some extent on the presence of the plasticiser. These disadvantages of $\alpha,\alpha$-diphenyldiethyl ether are particularly serious in the production of films from crystalline vinylidene chloride polymers.

The invention comprises the novel products as well as the novel processes and steps of processes according to which such products are manufactured, the specific embodiments of which are described hereinafter by way of example and in accordance with which I now prefer to practice the invention.

It has now been discovered that esters of substantially linear polyethers derived from meta- or para-bis-($\alpha$-hydroxyethyl)benzene are particularly valuable plasticisers for crystalline vinylidene chloride polymers because they not only have excellent plasticising properties, compatibility and heat and light stabilising properties, but also they possess relatively low volatilities with the result that they remain in plasticised articles for much longer periods than, for example, does $\alpha,\alpha'$-diphenyldiethyl ether.

Accordingly the present invention provides a plasticised composition having good light and heat stability which comprises a crystalline vinylidene chloride polymer and an ester of a non-gelled substantially linear polyether derived from meta- and/or para-bis($\alpha$-hydroxyethyl)-benzene.

By the expression "a crystalline vinylidene chloride polymer" is meant polyvinylidene chloride and copolymers of vinylidene chloride with other copolymerisable compounds which are capable of existing in crystalline and orientated crystalline states. In practice it is found that the copolymers, if they are to be crystalline, should contain at least 70% vinylidene chloride units in their molecular structure. By the expression "vinylidene chloride unit" is meant the group —$CH_2$—$CCl_2$— present in polymers and copolymers of vinylidene chloride. Monomers which may be copolymerised with vinylidene chloride are well known and include vinyl chloride, methyl acrylate, ethyl acrylate, methyl methacrylate, dimethyl maleate, diethyl maleate, vinyl acetate, acrylonitrile and mixtures thereof.

The ester plasticisers of the present invention are obtained by forming ester groups from the free hydroxyl groups of the polyether and any carboxylic acid group. The precise nature of the acid radical from which the ester plasticisers are formed is not critical, but the most advantageous results are obtained by esterifying the hydroxyl groups of the polyether with a carboxylic acid having a formula selected from the group consisting of R.COOH and NHX.COOH, wherein R is an aliphatic, aromatic or aromatic-aliphatic group, and X is an aryl group in which the aryl nucleus is attached directly to the nitrogen atom. Suitable esters include aliphatic esters such as the acetate, propionate, butyrate and the like, aromatic esters such as the benzoate and the phthalate and the aromatic-aliphatic esters such as the phenyl-acetate. The urethanes or esters of carbamic or substituted carbamic acids may also be employed. Particularly valuable results have been obtained from the use as ester plasticisers of the $\alpha$-naphthyl and phenyl urethanes derived from the free hydroxyl groups of the polyethers.

The substantially linear polyethers from which the ester plasticisers of the present invention are derived are themselves obtained by carrying out a controlled intra-molecular elimination of water from the hydroxyl groups of meta- or para-bis-($\alpha$-hydroxy-ethyl)benzene to produce a non-gelled product. This polyetherification reaction is most suitably carried out by heating the simple glycol to an elevated temperature, e.g. 150° C. to 250° C. in the presence of a carboxylic acid catalyst having a dissociation constant greater than $1 \times 10^{-4}$, preferably greater than $1 \times 10^{-3}$. A preferred catalyst for this process is oxalic acid. The process is described and claimed in British Patent No. 801,429.

The structure of the ester plasticisers of the present invention is illustrated by the following representation of the esters derived from the para-isomer:

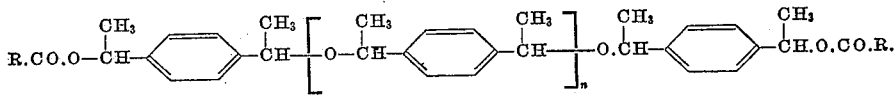

where R.CO.OH represents the carboxylic acid from which the ester is derived, R being as above defined, and "n" represents the degree of polymerisation of the polyether and in practice lies within the range 0 to about 20. The linear polyethers as most conveniently prepared consist of mixtures of polyethers of varying molecular weights and it is preferred that the average value of "n" for the polyether employed should be in the range 1 to 3.

In carrying out the polyetherification of the meta- or para-bis-(α-hydroxyethyl)benzene using a carboxylic acid catalyst it is believed that in addition to the polyetherification reaction some condensation of the hydroxy groups with nuclear hydrogen atoms ocurs with the formation of hydroxy aralkyl groups within some of the polyether molecules. Such substitution causes the polyether to contain groups having the following structural formula (again illustrated for the para-isomer):

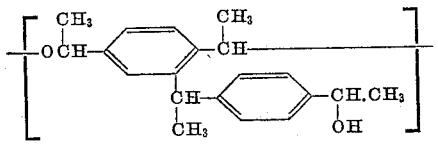

The degree to which such side reactions occur in the production of a non-gelled product is small since a high proportion of this type of reaction causes the polyether to gel.

The esterification of the polyether may be carried out by any suitable method. It is preferred to use those esterification procedures, for example the use of an acid halide and a base or the use of an acid anhydride, which do not involve the use of a strong acid esterification catalyst because there is a tendency for the polyethers to gel when heated in the presence of a strong acid.

The amount of plasticiser which may usefully be incorporated with the crystalline vinylidene chloride polymer depends to some extent on the particular polymer chosen and on the properties desired in the final product; in general, plasticiser contents of from 5 to 50 percent of the weight of the polymer are suitable. The plasticised compositions of the present invention are particularly suitable for the production of fibres or filaments and films and, in the production of such articles, the preferred type of polymer consists of that prepared by the polymerisation of a monomer mixture of about 85% by weight of vinylidene chloride and about 15% by weight of vinyl chloride. With such polymers the preferred quantity of plasticiser is of the order 7–14% by weight of the polymer. With less than 5% of plasticiser, the composition does not usually flow readily enough on heating and the extruded filament or film may be discoloured due to degradation, whilst with more than 15% of plasticiser, the tensile strength of the extruded filament or films tends to become too low.

The plasticiser may be mixed with the polymer in any suitable way. Thus, for example, the plasticiser may be added directly to the finely powdered polymer and intimate mixing effected by mechanical means, such as grinding in a ball mill. Alternatively, the plasticiser may be dissolved in a volatile organic solvent, such as acetone or benzene, the solution thoroughly mixed with the powdered polymer and the solvent removed from the resulting composition by drying. If the crystalline vinylidene chloride polymer is capable of being dissolved in an organic solvent, the plasticiser may be added to the said solution to form a homogeneous mixture, and the plasticised composition recovered by evaporation. If the polymer is available in the form of an aqueous dispersion of small particles, a solution of the plasticiser in a water-miscible organic solvent, such as ethanol, acetone, or dioxan, may be added slowly with stirring to such an aqueous dispersion, and the resulting uniform polymeric aqueous composition separated by filtration or other suitable means and subsequently dried. If the crystalline vinylidene chloride polymer is to be prepared in aqueous dispersion, the plasticiser may be added to the monomer mixture prior to or during the polymerisation; at the end of polymerisation, an intimate mixture of plasticiser and finely divided polymer may be separated by coagulation, filtration, or other suitable means.

The manner in which the plasticisers of this invention are prepared, and the manner in which they are added to the crystalline vinylidene chloride polymer are not critical, provided that intimate mixing is obtained, and the resulting compositions, however prepared, show satisfactory flow properties and adequate heat stability at the temperatures required for processing.

The plasticised compositions of the present invention may also contain, or be compounded with lubricants, other plasticisers, pigments, dyes and the like, used for the purpose of facilitating the processing of the compositions and for providing the required colour in the final article. If desired other heat or light-stabilisers used or described in the art may also be present.

The following examples illustrate the practice of the invention. In all cases, the ester plasticisers of the present invention showed good compatibility with the vinylidene chloride copolymers and gave rise to plasticised compositions having good heat and light stabilities.

*Example 1*

A mixed polyether, having an average molecular weight of about 470, was obtained from para-bis(α-hydroxyethyl) benzene, by heating 100 grams thereof with 1 gram of anhydrous oxalic acid in an oil bath maintained at 180° C. for one hour. Distillation of the water evolved during the condensation reaction was facilitated by passing a stream of nitrogen through the apparatus for the reaction period. On cooling the product to room temperature a water white extremely viscous syrup was obtained. This polyether was converted into the acetate by refluxing it with excess acetic anhydride for five hours. The mixture was then distilled under reduced pressure and the residue freed from traces of acid by washing an ethereal solution with aqueous sodium carbonate solution. The acetylated polyether was recovered by evaporating the solvent from the ethereal solution and was shown by infra-red analysis to be fully acetylated.

This acetate was used to plasticise a vinylidene chloride/vinyl chloride copolymer containing 85% vinylidene chloride units in its molecular structure, by mixing the copolymer with an acetone solution of the plasticiser (10% by weight on the copolymer) and subsequently removing the acetone at 50° C. The resulting plasticised composition was then formed into pellets and extruded on a small ram extruder through an orifice 0.030 inch in diameter, the barrel of the extruder being heated to a temperature of 170–175° C. The filament so extruded was well plasticised and was white in colour and could be easily drawn in a ratio of 4:1, to give a filament of good tensile properties.

*Example 2*

The benzoyl derivative of the same polyether as that described in Example 1 was prepared by slowly adding 33.5 mls. of benzoyl chloride to a solution of 13 grams of polyether dissolved in 65 mls. of pyridine. The reactants were refluxed for 30 minutes to complete the reaction and then cooled and washed with an aqueous sodium bicarbonate solution. The product separated out as a fully benzoylated reddish oil which was dried in a vacuum oven. The benzoate of the polyether thus prepared was used as in Example 1 to plasticise the same vinylidene chloride/vinyl chloride copolymer. The plasticised composition could be extruded at 170–175° C. to give a uniform filament which was very pale in colour.

*Example 3*

The α-naphthyl urethane derivative of the polyether described in Example 1 was prepared by dissolving 6 grams of the polyether in 25 mls. of toluene and refluxing the mixture for 10 minutes with 1 gram of α-naphthyl isocyanate. 25 mls. of methanol were then added to destroy any residual isocyanate and the toluene and methanol were then distilled off. Last traces of solvent were removed in a vacuum oven.

This α-naphthyl urethane derivative was then used to plasticise the same copolymer, the amount used being 10% by weight on the copolymer, and, on extrusion, the plasticised composition gave good filaments showing adequate plasticisation and having a very light colour.

*Example 4*

A polyether was prepared as described in Example 1 but the pure para-bis(α-hydroxyethyl)benzene used therein was replaced with an equal weight of a mixture of the meta- and para-isomers of bis(α-hydroxyethyl) benzene. This polyether was then acetylated by the process described in Example 1 to give an acetate which was used to plasticise the same vinylidene chloride/vinyl chloride copolymer in a proportion of 10% by weight on the copolymer. The resulting composition was extruded at 170–175° C. to give a smooth water white filament which could be easily drawn at a ratio of 4:1 to give a filament having exceedingly good tensile properties.

*Example 5*

200 grams of para-bis(α-hydroxyethyl)benzene and 2 grams of anhydrous oxalic acid were melted together and stirred in a bath at 163–193° C. for 1¼ hours. Moisture was removed by application of slightly reduced pressure and by a brisk current of nitrogen.

The resulting polyether was heated with 55 grams of phthalic anhydride, which was added in portions over a period of 1 hour. The reaction mixture was kept well stirred in a bath at 140° C. After a total of 1¼ hours the viscous melt was poured hot. It set to a pale-yellow brittle transparent resin, having a low softening point. The acidity of the ester as —COOH was 7.12% w./w. It was soluble in organic solvents.

This resin was used to plasticise the same vinylidene chloride/vinyl chloride copolymer and gave rise to a composition having good heat stability.

*Example 6*

30 lbs. of the same vinylidene chloride/vinyl chloride copolymer were plasticised with 8% acetylated polyether prepared as described in Example 1; 2% of 2-hydroxy-5-chlorobenzophenone was incorporated as an additional light stabiliser. The plasticisation was carried out in acetone slurry, the composition being finally dried to remove the acetone.

The copolymer was then fed into a production model 2 in. screw extruder and extruded for about 1½ hours to a satisfactory light coloured fibre. When the screw was eventually removed from the machine, the polymer adhering to it showed less degradation, i.e. was less coloured, than when a similar extrusion was carried out using a polymer plasticised with αα′-diphenyldiethyl ether.

A sample of the fibre so produced was placed in an oven at 100° C. for 144 hours when it showed much less darkening in colour than one plasticised with αα′-diphenyl-diethyl ether and containing 2-hydroxy-5-chlorobenzophenone as light stabiliser.

The low volatility of the plasticisers of the present invention as compared with αα′-diphenyldiethylether is shown in the following example.

*Example 7*

A plasticised composition was made up as described in Example 1 from the same ingredients using 8% by weight of plasticiser. This composition was pressed into a sheet of thickness 0.030 inch. By way of comparison a similar sheet was prepared from the same copolymer plasticised with 8% by weight of αα′-diphenyldiethyl ether.

Identical specimens were cut from each sheet and their loss in weight measured after they had been heated in a stream of air for 24 hours at 100° C. The weight loss of the plasticised composition according to the present invention was 0.5% whereas that of the composition containing αα′-diphenyldiethyl ether was 1.5%.

*Example 8*

The following ingredients were mixed in a sealed, thick walled, Pyrex glass reaction tube and the mixture heated at 50° C. for 22 hours while the tubes were rotated:

| | |
|---|---|
| Vinylidene chloride _____grams__ | 11.25 |
| Vinyl chloride _____do____ | 2.25 |
| The acetate plasticiser of Example 1 _____do____ | 0.9 |
| Pentaerythritol monostearate _____do____ | 0.12 |
| o-Chlorbenzoyl peroxide _____do____ | 0.06 |
| Distilled water _____cc__ | 60 |

The yield of plasticized copolymer was over 90%. The presence of the polyether acetate plasticiser in the polymerisation charge did not result in any noticeable increase in induction period or diminution of reaction rate compared with a control polymerisation carried out in the absence of the plasticiser.

I claim:

1. A plasticised composition having good light and heat stability comprising a crystalline vinylidene chloride polymer and a non-polymeric carboxylic acid ester of a linear polyether of a compound selected from the group consisting of meta- and para-bis(α-hydroxyethyl)benzene and mixtures thereof, said ester being present in a proportion of about 5–50% by weight of said polymer.

2. A plasticised composition as claimed in claim 1, wherein the polymer is obtained by the copolymerisation of about 85% by weight of vinylidene chloride and about 15% by weight of vinyl chloride, and the quantity of plasticiser employed is about 7–14% by weight of the copolymer.

3. A plasticised composition having good light and heat stability comprising a crystalline vinylidene chloride polymer and the acetic acid ester of the linear polyether of meta-bis (α-hydroxyethyl) benzene, said ester being present in a proportion of about 5–50% by weight of said polymer.

4. A plasticised composition having good light and heat stability comprising a crystalline vinylidene chloride polymer and the acetic acid ester of the linear polyether of para-bis (α-hydroxyethyl) benzene, said ester being present in a proportion of about 5–50% by weight of said polymer.

5. A plasticised composition having good light and heat stability comprising a crystalline vinylidene chloride polymer and the acetic acid esters of the linear polyethers of a mixture of meta- and para-bis (α-hydroxyethyl) benzene, said esters being present in a proportion of about 5-50% by weight of said polymer.

References Cited in the file of this patent

UNITED STATES PATENTS

| | | |
|---|---|---|
| 2,166,557 | Stoesser et al. | July 18, 1939 |
| 2,253,886 | Britton et al. | Aug. 26, 1941 |
| 2,344,491 | Britton et al. | Mar. 21, 1944 |
| 2,446,464 | Evans et al. | Aug. 3, 1948 |

FOREIGN PATENTS

| | | |
|---|---|---|
| 565,269 | Great Britain | Nov. 3, 1944 |